United States Patent Office

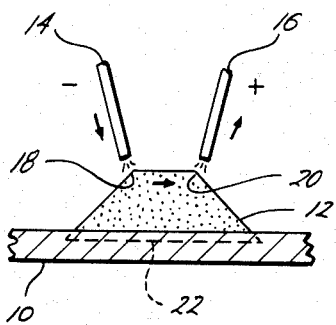
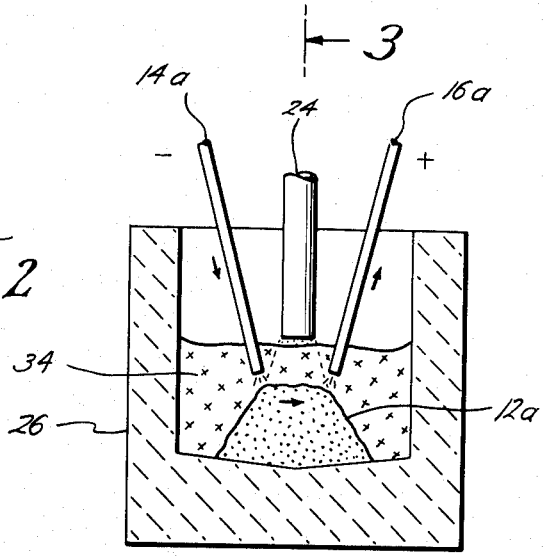
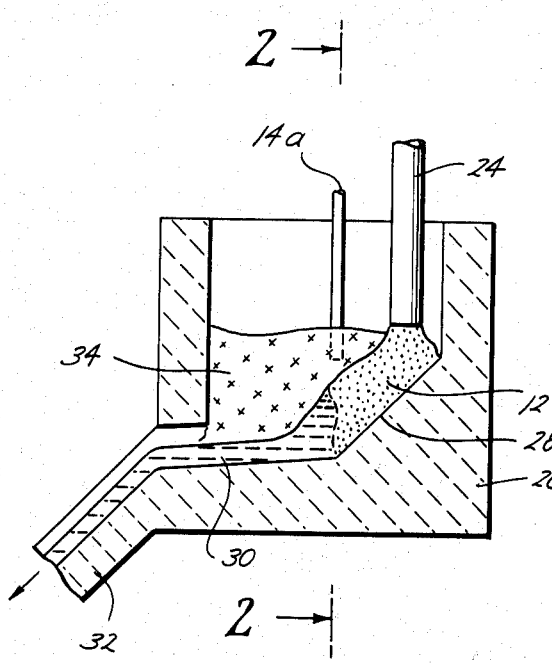

3,204,077
Patented Aug. 31, 1965

3,204,077
WELDING AND CASTING PROCESS
Roman F. Arnoldy, Houston, Tex., assignor to R.I. Patents, Inc., Houston, Tex., a corporation of Texas
Filed Jan. 31, 1963, Ser. No. 255,395
7 Claims. (Cl. 219—76)

The present invention relates to new and improved processes for welding, cladding, overlying, casting and the like.

In my co-pending application, now United States Patent No. 3,076,888, granted February 5, 1963, there is disclosed and claimed a Method of Producing Weld Coatings or Fusion Welds. The methods described and claimed in such patent have many advantages in welding, cladding, overlaying and the like as therein explained.

It would be advantageous, however, to provide a method of welding in which there are very high melting rates, even higher than those in my previously mentioned patent, in which only a small portion of the current passes through the base metal thereby promoting bonding with a minimum of penetration, in which it is unnecessary to oscillate the wire or electrode to weld with large piles and at heavy deposition rates, in which wide areas can be covered with one bead, and in which maximum electromagnetic stirring of the weld material is obtained providing a better crystal structure.

It would also be advantageous in casting to provide a method by which a very accurate analysis or predetermined composition is obtained, in which substantially the exact amounts of metal desired, small or large, can be poured, and in which various of the steps and the time required therefor, in other methods are eliminated, for example, furnace melting, pouring into ladels, ladels to crucibles, crucibles to molds, and the like. It would also be highly advantageous to provide a casting method in which the cast metal is produced only as needed and thus is exposed to air for a relatively short length of time thus resulting in less oxidation and deterioration of the metal, in which the process of casting is easily adaptable to vacuum melting for producing very high quality metal, and in which small space and relatively little investment are required.

The present invention is directed to such welding and casting processes by which the above-mentioned advantages are obtained.

It is therefore an object of the present invention to provide an improved method of welding which has a relatively high melting rate.

It is a further object of the present invention to provide a method of welding in which only a small portion of the current passes through the work or base metal thereby promoting bonding but minimizing penetration of the work.

It is yet a further object of the present invention to provide a welding process in which it is unnecessary to oscillate the wire or electrode to weld with large piles and at heavy deposition rates, although this may be done if desired.

Still a further object of the present invention is the provision of a welding process in which wide areas can be covered with one bead.

Still a further object of the present invention is the provision of a welding process in which maximum electromagnetic stirring of the alloy material is provided resulting in a better crystalline structure of the weld or overlay.

A further object of the present invention is the provision of a method of casting in which castings of highly accurate predetermined composition or analysis are obtained.

Yet a further object of the present invention is the provision of a casting method in which substantially exact amounts of metal desired, whether small or large, can be poured.

Still a further object of the present invention is the provision of a casting method in which many steps and considerable time are eliminated from the previous casting methods, for example, the elimination of furnace melting, pouring to ladels, pouring from ladels to crucibles, pouring from crucibles to molds and the like.

Yet a further object of the present invention is the provision of an improved casting method in which there is relatively less oxidation and deterioration of the metal and which is obtained by producing the metal only as needed so that the metal is exposed to the air for a relatively short length of time.

Yet a further object of the present invention is the provision of such a casting method which is readily adapted to vacuum melting for the production of high quality metal castings.

Still a further object of the present invention is the provision of such an improved method of casting in which a relatively small amount of space is required and relatively little investment is required.

A still further object of the invention is the provision of such a welding process in which there can be a relatively wider pile, in which there is less danger of arcing to the base metal, and in which in those instances where less ratio of powder to wire than required to use all of the heat of the arc is desired there is little or substantially no danger of burning the base metal since the current does not pass through the base.

Other and further objects, features and advantages of the invention will be apparent from the following description of presently-preferred embodiments thereof, taken in conjunction with the accompanying drawing, in which—

FIGURE 1 is a schematic drawing illustrating a welding process according to the invention, FIGURE 2 is a sectional view taken along the line 2—2 of FIGURE 3 and illustrating a casting process according to the invention, and FIGURE 3 is a sectional view taken along the line 3—3 of FIGURE 2.

Before referring to the drawing, the welding process of the present invention in brief comprises passing an arc from a wire or other electrode to a pile of granular or powdered iron, steel, alloy or other weld material which is electrically conductable, flowing the current through the granular material and arcing again from another portion of the pile to another wire or other electrode without arcing to the base metal or work. Thus, the electric circuit comprises the first electrode, the pile and the second electrode, the latter being grounded. Each of the wires or other electrodes are melted at a controlled or predetermined measured rate and traversed over the pile at a predetermined rate so as to produce an alloy weld having a predetermined composition. Since there is no arcing to the base metal or work, this metal is heated by the superheat of the weld material whereby only a very thin skin at the surface of the base metal or work is melted by which the weld material is bonded to the base metal or work. This advantageously avoids contamination of the weld or overlay with large amounts of base metal or work and provides a very rapid welding process having the advantages previously mentioned.

The improved casting process of the present invention is the same as that of the welding process except that the casting material, which is electrically conductive, granular or powdered material, is melted and placed in a suitable mold or formed into a casting.

The pile of granular or powdered weld or casting material may be placed in position in advance of traversing the pile with the electrodes or the pile may be laid down substantially simultaneously with the movement of the electrodes. In this latter instance, a feeder, with at least two electrodes rather than one, such as disclosed in my U.S. Patent No. 3,060,307 and my co-pending application entitled Feeder for Welds, Serial No. 213,266 may be used.

The method is useful in the production of weld overlays, cladding, fusion welds, whether open arc, shielded or submerged and in the production of castings.

Referring now to FIGURE 1, the numeral 10 designates the work or base metal on which the pile 12 of granular or powdered electrically-conductive, weld materials is placed. The pile 12 may take any desired form or shape and, as previously mentioned, may have been previously placed upon the work 10 or may be laid down substantially simultaneously with, that is just ahead of the movement of, the electrodes.

A pair of electrodes, designated by the numerals 14 and 16, are provided and are spaced adjacent the pile, as illustrated, so that the current flow is in the direction of the arrows from the electrode 14, arcing to the top and at one side of the pile 12, flowing through the pile 12 as indicated, arcing from the top and other side 20 of the pile to the electrode 16 which is grounded. This causes the pile of granular material 12 to be heated sufficiently to cause it to melt, the superheat of the pile in turn causing a very thin skin or penetration, as illustrated by the dotted line 22 in the work 10, to melt by which the pile of weld material is bonded to the work or base metal 10.

The voltage should be such that sufficient heat is provided for the purposes mentioned, but should be such that there is no arcing through the pile 12 to the base metal. In many applications, from about 55 to about 75 volts is satisfactory although other voltages may be used.

As previously mentioned, the process may be either open arc, shielded arc or submerged. The shielding and submerging, however, have been omitted from FIGURE 1 of the drawing as conventional shielding and submerging may be utilized. Any desired shielding material or flux may be utilized. For example, any gas shielding may be used, such as argon, carbon dioxide and the like; and any flux may be used, such as any of the powdered flux materials normally used in submerged welding.

The weld material may be any desired materials so long as they are granular or powdered and are electrically conductive. The wire electrodes 14 and 16 may be of any desired material and these electrodes form a constituent in the final weld. The electrodes, instead of being solid, may include powdered weld material if desired. The electric circuit thus includes the electrode 14, the pile 18 and the electrode 16 to ground, not shown.

Thus, numerous predetermined compositions may be welded to the base metal or work of a predetermined composition uncontaminated by large amounts of base metal.

Thus, by continuing the process across a particular area or surface of the base metal or work 10, a coating is welded to the base 10 which has a substantially uniform thickness and is substantially homogenous throughout and is of a closely controlled predetermined composition.

If desired, the electrodes 14 and 16 may be oscillated, however, relatively large piles and heavy deposition rates are obtained without oscillation and a relatively wide area is covered with a single bead.

In utilizing the process in casting, and referring to FIGURES 2 and 3, in which the reference letter "a" has been added to numerals designating parts corresponding to those of FIGURES 2 and 3, the pile 12a is fed by any suitable means, such as by the tube 24 into a melting chamber 26 formed of refractory material. The melting chamber may take any desired shape or form but preferably should promote flow such as by having the inclined back portion 28.

The pile 12a of granular material and electrodes 14a and 16a are fed to the melting chamber at a predetermined rate and as they melt to form the composition of the casting, the melted stream 30 is poured in a suitable mold, not shown through the spout 32, which spout may be omitted, if desired. A suitable gas or flux cover 34 is provided by any gas shielding or flux materials, as previously mentioned. This results in a casting of a highly controlled predetermined composition or analysis and one that is exposed to the air a relatively short length of time thereby resulting in relatively low deterioration and oxidation of the metal.

Also, as previously mentioned, the process is utilized in vacuum melting in which the powder and electrodes are melted as described under a negative pressure by which very high quality metal is produced.

While only a single pair of electrodes are illustrated for the purpose of disclosure, if desired, multiple pairs of electrodes may be utilized to rapidly and quickly weld overlay a large surface area or to melt large quantities of material.

No specific examples of the composition of particular welds or castings are given, since any desired composition of a weld or casting may be obtained by simply providing materials having the desired percentages of a particular composition, taking into account the material of the electrodes, and the desired properties of the weld overlay or casting, for example, for hard facing, corrosion, heat resistance, surface building up, and the like.

The present invention, therefore, is well suited and adapted to attain the objects and ends and has the advantages and features mentioned as well as others inherent therein.

While presently-preferred embodiments of the invention have been given for the purpose of disclosure, and the disclosure has been directed to welding and casting processes, other embodiments, applications and uses will be apparent to those skilled in the art which are encompassed within the spirit of the invention as defined by the scope of the appended claims.

What is claimed is:

1. A method of producing a weld or casting comprising,
   depositing a measured quantity of electrically-conductive, granular weldable material,
   positioning a first electrode in closely-spaced relation to a portion of the electrically-conductive, granular weldable material,
   positioning a second electrode in spaced relation to the first electrode and in closely-spaced relation to another portion of the electrically-conductive, granular weldable material,
   melting the deposited electrically-conductive, granular weldable material and portions of the first electrode and the second electrode by flowing an electric current in series through the first electrode, then through the weldable material and then through the second electrode, and
   feeding both of the electrodes at a measured rate while continuing to deposit coordinated measured quantities of the weldable material during melting thereof thereby obtaining a predetermined alloy composition formed of the portions of the first and second electrodes and the weldable material.

2. A method of producing a weld comprising,
   positioning a first electrode in spaced relation to an upper portion of a pile on a base metal,
   said pile consisting of granular, electrically conductive weldable material,
   positioning a second electrode in spaced relation to the first electrode and in spaced relation to another upper portion of the pile, melting the pile and portions of the first and second electrodes by flowing an electric current in series through the first electrode, then the pile and then the second electrode, maintaining the electric current and the spacing of the first electrode to the upper portion of the pile and the second electrode to the other upper portion of the pile so that an arc is passed from the first electrode to the upper portion of the pile and a second arc is passed from the other upper portion of the pile to the second electrode without arcing to the base metal whereby the superheated portion of the pile melts only a very thin skin of the base metal and minimizes dilution thereby, and moving and feeding the first electrode and the second electrode at measured predetermined rates along the pile while the portions thereof are being melted thereby bonding a weld of predetermined composition on the base metal.

3. A method of producing a weld on a weld area comprising, placing a predetermined quantity of granular, electrically-conductive weldable material on a predetermined section of the weld area, positioning a first electrode in spaced relation to a portion of the weldable material, positioning a second electrode in spaced relation to the first electrode and in spaced relation to another portion of the weldable material, melting the weldable material and portions of the first electrode and the second electrode by flowing an electric current in series through the first electrode, then the weldable material and then through the second electrode, moving and feeding the first electrode and the second electrode at a predetermined rate while continuing to deposit predetermined correlated quantities of the weldable material on the weld area while maintaining the electric current and the spacing of the first electrode and the second electrode with respect to the weldable material so that a first arc passes between the first electrode and the weldable material and a second arc passess between the weldable material and the second electrode without arcing to the base whereby the melted first electrode, second electrode and weldable material melts a thin surface of the base metal thereby bonding a weld on the base metal of a predetermined composition substantially uncontaminated by the base metal.

4. A method of casting comprising, positioning a first electrode in spaced relation to a portion of a pile of electrically-conductive, particulate casting material, positioning a second electrode in spaced relation with the first electrode and spaced from another portion of the pile, melting the pile and portions of the first electrode and the second electrode by flowing an electric current through the first electrode, then the pile and then the second electrode, and feeding the first electrode and the second electrode at a measured rate and feeding correlated measured quantities of the particulate casting material to the pile during the melting, and discharging the melted alloy formed by the melted portions of the electrodes and the melted portion of the casting material.

5. In a method of casting or melting, depositing predetermined metered quantities of granular, electrically-conductive alloying materials in a melting chamber, positioning a first electrode in spaced relation with a portion of the alloying material, positioning a second electrode in spaced relation with a first electrode and in spaced relation with another portion of the alloying material, melting the alloying material and portions of the first electrode and the second electrode by flowing an electric current in series through the first electrode then the alloying material and then through the second electrode, feeding both the first electrode and the second electrode at a measured rate while depositing the metered quantities of the alloying material during melting thereof thereby obtaining a casting alloy of predetermined composition formed of portions of the first electrode, the second electrode and the alloying material, and discharging the formed melted alloy from the melting chamber as it is melted.

6. The method of claim 4 including, forming the formed melted alloy into a casting.

7. The method of claim 5 including, covering the alloying material and the portions of the electrodes during the melting thereof with a material selected from the group consisting of gas shielding and flux.

References Cited by the Examiner

UNITED STATES PATENTS

| Re. 21,733 | 3/41 | Armstrong | 75—10 |
| 721,703 | 3/03 | Heroult | 13—9 |
| 3,076,888 | 2/63 | Arnoldy | 219—73 |
| 3,102,025 | 8/63 | Wilcox | 75—128 |

RICHARD M. WOOD, *Primary Examiner.*